US012411369B2

United States Patent
Kowalevicz et al.

(10) Patent No.: US 12,411,369 B2
(45) Date of Patent: Sep. 9, 2025

(54) DUAL-POLARIZATION ROTATIONALLY-INSENSITIVE MONOSTATIC TRANSCEIVER WITH STANDARD FIBER

(71) Applicant: Raytheon Company, Waltham, MA (US)

(72) Inventors: Andrew M. Kowalevicz, Arlington, VA (US); Gary M. Graceffo, Burke, VA (US); Benjamin P. Dolgin, Alexandria, VA (US)

(73) Assignee: Raytheon Company, Arlington, VA (US)

( * ) Notice: Subject to any disclaimer, the term of this patent is extended or adjusted under 35 U.S.C. 154(b) by 283 days.

(21) Appl. No.: 17/933,785

(22) Filed: Sep. 20, 2022

(65) Prior Publication Data

US 2023/0090667 A1   Mar. 23, 2023

Related U.S. Application Data

(60) Provisional application No. 63/246,693, filed on Sep. 21, 2021, provisional application No. 63/246,676, (Continued)

(51) Int. Cl.
*G02F 1/09* (2006.01)
*G02B 6/036* (2006.01)
(Continued)

(52) U.S. Cl.
CPC ......... *G02F 1/093* (2013.01); *G02B 6/03622* (2013.01); *G02B 6/2746* (2013.01);
(Continued)

(58) Field of Classification Search
CPC .. G02B 6/2746; G02B 27/283; H04B 10/614; G02F 1/09
See application file for complete search history.

(56) References Cited

U.S. PATENT DOCUMENTS

| 5,052,786 A | 10/1991 | Schulz |
| 5,729,380 A | 3/1998 | Betin et al. |

(Continued)

FOREIGN PATENT DOCUMENTS

| CN | 101089667 A | 12/2007 |
| CN | 101089667 B | 5/2013 |

(Continued)

OTHER PUBLICATIONS

Bohata et al., "Characterization of dual-polarization LTE radio over a free-space optical turbulence channel", Applied Optics, vol. 54, No. 29, Aug. 2015, 8 pages.

(Continued)

*Primary Examiner* — Pranesh K Barua

(57) ABSTRACT

An apparatus includes polarization beamsplitters that each separate incoming and outgoing optical signals having different polarizations. The apparatus also includes directionally-dependent polarization rotation optical assemblies that each maintain a polarization of one of the incoming and outgoing optical signals and to rotate a polarization of another of the incoming and outgoing optical signals. The apparatus further includes a third polarization beamsplitter that combines the outgoing optical signals to produce transmit optical signals and separate receive optical signals to produce the incoming optical signals.

20 Claims, 3 Drawing Sheets

Related U.S. Application Data filed on Sep. 21, 2021, provisional application No. 63/246,648, filed on Sep. 21, 2021.

(51) Int. Cl.
| | | |
|---|---|---|
| *G02B 6/27* | (2006.01) | |
| *G02B 27/28* | (2006.01) | |
| *H04B 10/112* | (2013.01) | |
| *H04B 10/61* | (2013.01) | |

(52) U.S. Cl.
CPC ......... *G02B 6/2766* (2013.01); *G02B 27/283* (2013.01); *H04B 10/1125* (2013.01); *H04B 10/614* (2013.01); *G02F 1/09* (2013.01)

(56) References Cited

U.S. PATENT DOCUMENTS

| | | | |
|---|---|---|---|
| 5,793,789 A | 8/1998 | Ben-Michael et al. | |
| 6,249,619 B1 * | 6/2001 | Bergmann | G02F 1/093 385/11 |
| 6,400,990 B1 | 6/2002 | Silvian | |
| 6,476,959 B2 | 11/2002 | Yao | |
| 6,545,805 B2 | 4/2003 | He et al. | |
| 6,563,982 B1 | 5/2003 | Xie et al. | |
| 6,577,900 B1 | 6/2003 | Silvian | |
| 6,977,763 B1 * | 12/2005 | Wang | G02B 27/286 359/245 |
| 7,027,198 B2 | 4/2006 | Yao | |
| 7,067,795 B1 | 6/2006 | Yan et al. | |
| 7,218,436 B2 | 5/2007 | Yao | |
| 7,409,157 B2 | 8/2008 | Arahira | |
| 7,436,569 B2 | 10/2008 | Yao et al. | |
| 7,440,181 B2 | 10/2008 | Starodoumov et al. | |
| 7,466,471 B2 | 12/2008 | Yao | |
| 7,508,579 B2 | 3/2009 | Starodoumov et al. | |
| 8,571,416 B2 | 10/2013 | Grobe | |
| 9,755,739 B1 | 9/2017 | Wang et al. | |
| 9,778,020 B2 | 10/2017 | Tumlinson et al. | |
| 9,989,700 B1 * | 6/2018 | Ayliffe | G02F 1/0955 |
| 10,069,562 B2 | 9/2018 | Wang | |
| 10,168,501 B2 | 1/2019 | Ashrafi | |
| 10,298,325 B1 | 5/2019 | Birnbaum et al. | |
| 10,326,526 B2 | 6/2019 | Ashrafi | |
| 11,170,318 B2 | 11/2021 | Ashrafi | |
| 11,233,573 B2 | 1/2022 | Sandberg | |
| 2001/0024317 A1 | 9/2001 | Yao | |
| 2002/0018618 A1 * | 2/2002 | Xie | G02B 6/32 385/33 |
| 2002/0076144 A1 * | 6/2002 | Tai | H04Q 11/0005 385/24 |
| 2002/0090161 A1 | 7/2002 | Naganuma | |
| 2002/0171931 A1 * | 11/2002 | McLeod | G02B 6/272 359/489.09 |
| 2002/0171933 A1 | 11/2002 | He et al. | |
| 2003/0004412 A1 | 1/2003 | Izatt et al. | |
| 2005/0088661 A1 | 4/2005 | Froggatt | |
| 2005/0200941 A1 | 9/2005 | Yao | |
| 2006/0023987 A1 | 2/2006 | Yao | |
| 2006/0045536 A1 | 3/2006 | Arahira | |
| 2007/0031151 A1 | 2/2007 | Cunningham et al. | |
| 2007/0223078 A1 | 9/2007 | Yao et al. | |
| 2007/0291358 A1 * | 12/2007 | Colbourne | G02F 1/093 359/484.04 |
| 2008/0030839 A1 | 2/2008 | Yao | |
| 2008/0030846 A1 | 2/2008 | Starodoumov et al. | |
| 2008/0042050 A1 * | 2/2008 | Tanaka | G02F 1/093 250/225 |
| 2009/0052016 A1 | 2/2009 | Starodoumov et al. | |
| 2011/0277552 A1 | 11/2011 | Chen et al. | |
| 2012/0051756 A1 | 3/2012 | Grobe | |
| 2012/0154783 A1 | 6/2012 | Goldberg et al. | |
| 2015/0295658 A1 | 10/2015 | Chen et al. | |
| 2016/0047987 A1 * | 2/2016 | Du | G02B 6/2773 359/484.05 |
| 2016/0112124 A1 | 4/2016 | Juarez et al. | |
| 2016/0341538 A1 | 11/2016 | Tumlinson et al. | |
| 2017/0242100 A1 * | 8/2017 | Hinokuma | G01S 17/95 |
| 2017/0242206 A1 * | 8/2017 | Chen | G02B 6/00 |
| 2017/0343750 A1 | 11/2017 | Ashrafi | |
| 2018/0069631 A1 | 3/2018 | Ashrafi | |
| 2018/0102843 A1 | 4/2018 | Wang | |
| 2018/0337722 A1 | 11/2018 | Paulsen et al. | |
| 2019/0391406 A1 * | 12/2019 | Chen | G02B 6/2746 |
| 2020/0083659 A1 | 3/2020 | Reeves-Hall et al. | |
| 2021/0133614 A1 | 5/2021 | Ashrafi | |
| 2021/0297160 A1 | 9/2021 | Sandberg | |

FOREIGN PATENT DOCUMENTS

| | | | | |
|---|---|---|---|---|
| CN | 107390324 A | * | 11/2017 | ........... G02B 6/2706 |
| CN | 104950407 B | | 7/2018 | |
| CN | 109286440 A | | 1/2019 | |
| CN | 209746185 U | * | 12/2019 | |
| CN | 111504296 A | | 8/2020 | |
| CN | 111969400 A | | 11/2020 | |
| EP | 1022590 A1 | | 7/2000 | |
| EP | 3358385 A1 | | 8/2018 | |
| EP | 2885886 B1 | | 2/2019 | |
| GB | 2439213 A | | 12/2007 | |
| RU | 2638095 C1 | | 12/2017 | |
| WO | WO-03009008 A2 | * | 1/2003 | ............. G02B 6/266 |

OTHER PUBLICATIONS

Abari et al., "A reconfigurable all-fiber polarization-diversity coherent Doppler lidar: principles and numerical simulations", Applied Optics, vol. 54, No. 30, Oct. 2015, 11 pages.

Nawaz et al., "A Compact, Bistatic Antenna System with Very High Interport Isolation for 2.4 GHz In-Band Full Duplex Applications", International Journal of Antennas and Propagation, vol. 2021, Jan. 2021, 8 pages.

Final Office Action dated Jun. 28, 2024 in connection with U.S. Appl. No. 17/933,779, 24 pages.

International Search Report and Written Opinion of the International Searching Authority dated Jan. 9, 2023 in connection with International Patent Application No. PCT/US2022/076954, 10 pages.

International Search Report and Written Opinion of the International Searching Authority dated Jan. 2, 2023 in connection with International Patent Application No. PCT/US2022/076739, 12 pages.

International Search Report and Written Opinion of the International Searching Authority dated Jan. 2, 2023 in connection with International Patent Application No. PCT/US2022/076735, 11 pages.

International Search Report and Written Opinion of the International Searching Authority dated Jan. 2, 2023 in connection with International Patent Application No. PCT/US2022/076736, 10 pages.

Non-Final Office Action dated Dec. 29, 2023 in connection with U.S. Appl. No. 17/933,779, 29 pages.

Beaudette et al., "Advances in Multimodal Imaging Using Double-Clad Fiber Couplers," Journal of Lightwave Technology, vol. 37, No. 22, 2019, 12 pages.

Elmansouri et al., "Compact Wideband Dual-Polarized In-Band Full-Duplex Antenna Subsystem," IEEE Transactions on Antennas and Propagation, vol. 69, No. 11, 2021, 7 pages.

Graceffo et al., "Hybrid RF FSO for Defense and 5G Backhaul," IEEE Globecom Workshops, 2019, 6 pages.

Notice of Allowance dated Sep. 20, 2024 in connection with U.S. Appl. No. 17/933,779, 9 pages.

* cited by examiner

DUAL-POLARIZATION ROTATIONALLY-INSENSITIVE MONOSTATIC TRANSCEIVER WITH STANDARD FIBER

CROSS-REFERENCE TO RELATED APPLICATIONS AND PRIORITY CLAIM

This application claims priority under 35 U.S.C. § 119(e) to U.S. Provisional Patent Application Nos. 63/246,648; 63/246,676; and 63/246,693 all filed on Sep. 21, 2021. These provisional applications are hereby incorporated by reference in their entirety.

This application is related to the following non-provisional patent applications being filed concurrently herewith:

U.S. patent application Ser. No. 17/933,766 filed Sep. 20, 2022 and entitled "SYSTEM AND METHOD FOR DIRECTIONALLY-DEPENDENT POLARIZATION MODIFICATION"; and U.S. patent application Ser. No. 17/933,779 filed Sep. 20, 2022 and entitled "DUAL-POLARIZATION ROTATIONALLY-INSENSITIVE MONOSTATIC TRANSCEIVER WITH DUAL CLADDING FIBER," now U.S. Pat. No. 12,271,069.

These non-provisional applications are hereby incorporated by reference in their entirety.

TECHNICAL FIELD

This disclosure is generally directed to optical systems. More specifically, this disclosure is directed to a dual-polarization rotationally-insensitive monostatic transceiver with standard fiber.

BACKGROUND

Optical communication systems use light to transport data between locations. Next-generation optical transceivers are being designed for use in free-space optical systems, which refer to systems where optical signals are transmitted and received through free space rather than through optical fibers. Increasing the data capacity of free-space optical systems is becoming more and more important as the demand for high-throughput data products increases. Using two polarizations of light in an optical signal can double the capacity of a single optical channel. However, this is typically achieved using separate transmit and receive apertures in devices using the optical channel, which increases the size, cost, and complexity of the devices. While some monostatic systems have been developed that permit simultaneous transmission and reception of optical signals using a single aperture, these systems rely on the use of multiple wavelengths without any dual polarization capabilities.

SUMMARY

This disclosure is directed to a dual-polarization rotationally-insensitive monostatic transceiver with standard fiber.

In a first embodiment, an apparatus includes first and second polarization beamsplitters each configured to separate incoming and outgoing optical signals having different polarizations. The apparatus also includes first and second directionally-dependent polarization rotation optical assemblies each configured to maintain a polarization of one of the incoming and outgoing optical signals and to rotate a polarization of another of the incoming and outgoing optical signals. The apparatus further includes a third polarization beamsplitter configured to (i) combine the outgoing optical signals to produce transmit optical signals and (ii) separate receive optical signals to produce the incoming optical signals.

In a second embodiment, a system includes a fiber coupling configured to couple to a fiber optic waveguide, where the fiber coupling includes first fiber terminals for a first channel and second fiber couplings for a second channel. The system also includes at least one first polarization beamsplitter configured to separate incoming and outgoing optical signals based on different polarizations of the incoming and outgoing optical signals. The system further includes at least one directionally-dependent polarization rotation optical assembly configured to maintain a polarization of one of the incoming and outgoing optical signals and to rotate a polarization of another of the incoming and outgoing optical signals. The system also includes a second polarization beamsplitter configured to (i) combine the outgoing optical signals from the channels to produce transmit optical signals and (ii) separate receive optical signals to produce the incoming optical signals for the channels.

In a third embodiment, a method includes separating incoming and outgoing optical signals having different polarizations using first and second polarization beamsplitters. The method also includes passing the incoming optical signals and the outgoing optical signals through first and second directionally-dependent polarization rotation optical assemblies. Each of the directionally-dependent polarization rotation optical assemblies maintains a polarization of one of the incoming and outgoing optical signals and rotating a polarization of another of the incoming and outgoing optical signals. The method further includes combining the outgoing optical signals to produce transmit optical signals and separating receive optical signals to produce the incoming optical signals.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
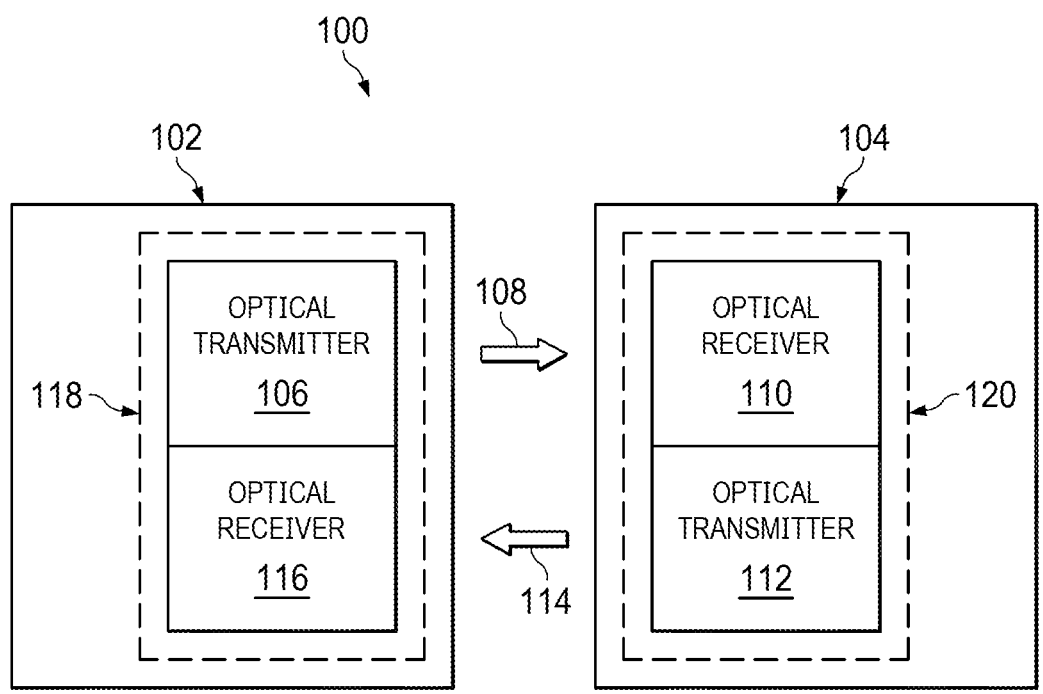
FIG. 1 illustrates an example free-space optical (FSO) system according to this disclosure.
Figure 2:
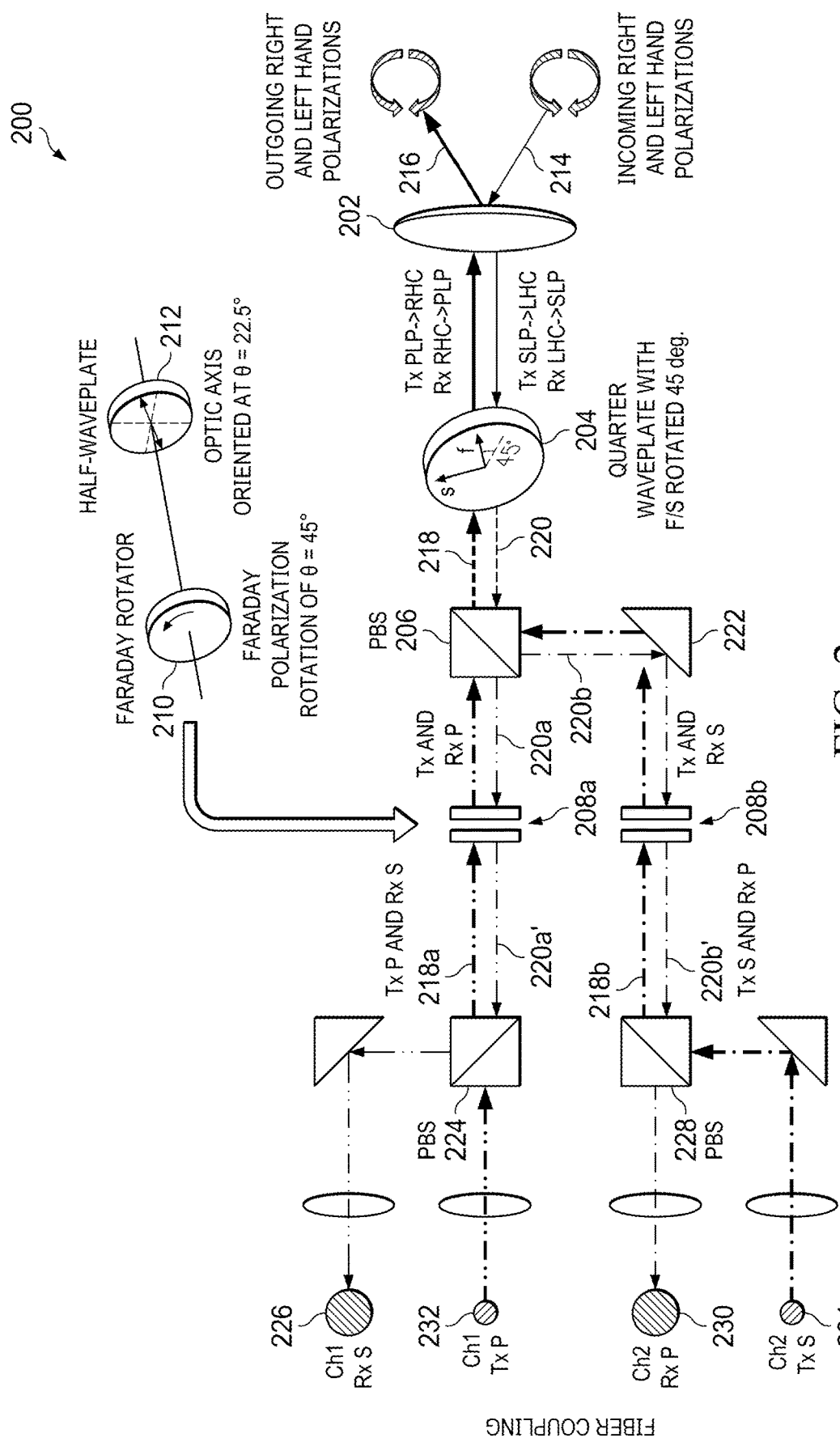
FIG. 2 illustrates an example monostatic optical transceiver according to this disclosure.
Figure 3:
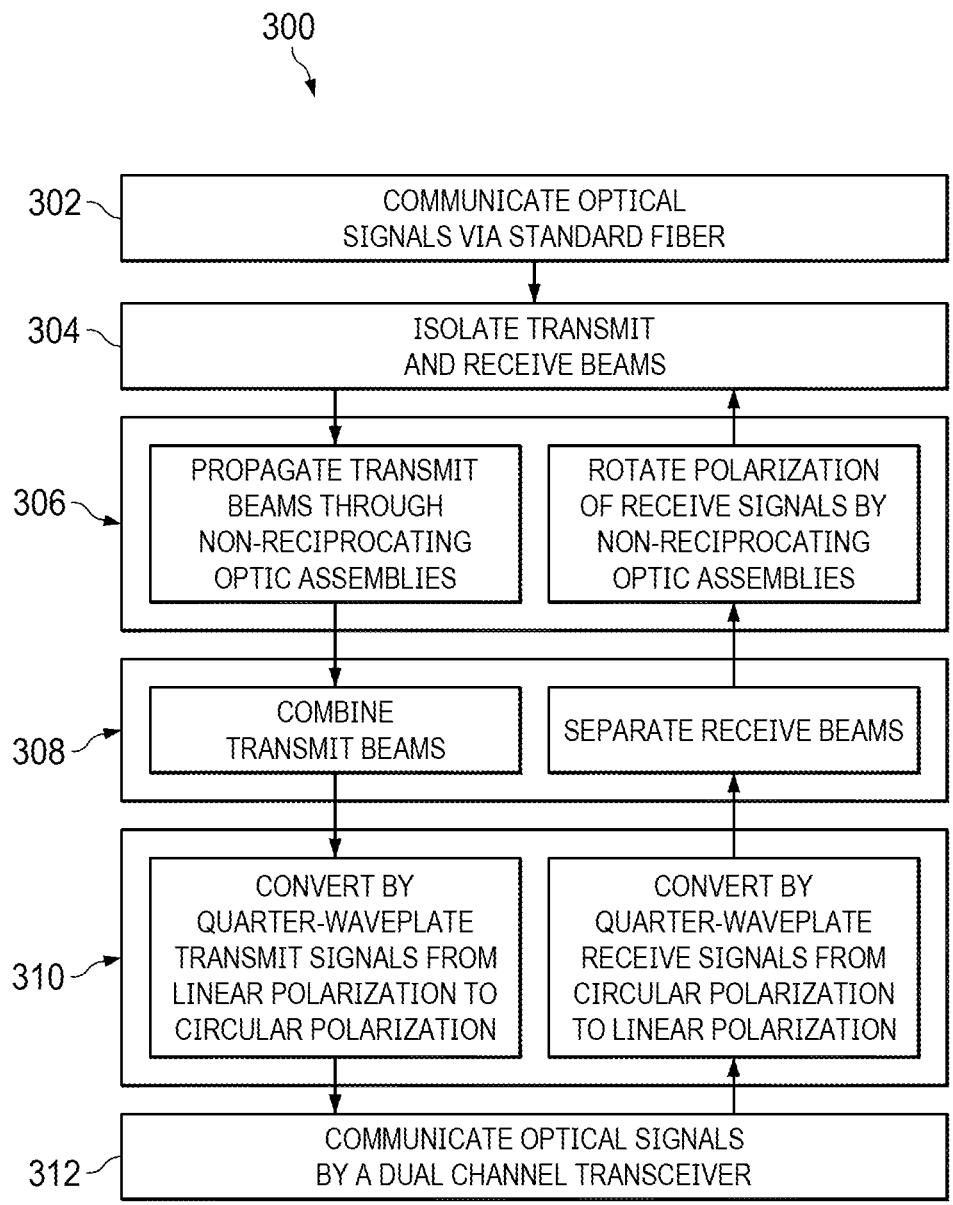
FIG. 3 illustrates an example method for transmitting and receiving multiple non-interfering polarization signals according to this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, optical communication systems use light to transport data between locations. Next-generation transceivers are being designed for use in free-space optical systems, which refer to systems where optical signals are transmitted and received through free space rather than through optical fibers. Increasing the data capacity of free-space optical systems is becoming more and more important as the demand for high-throughput data products increases. Using two polarizations of light in an optical signal can double the capacity of a single optical channel. However, this is typically achieved using separate transmit and receive apertures in devices using the optical channel, which increases the size, cost, and complexity of the devices. While some monostatic systems have been developed that permit simultaneous transmission and reception of optical signals using a single aperture, these systems rely on the use of multiple wavelengths without any dual polarization capabilities.

This disclosure provides various implementations of dual-polarization rotationally-insensitive monostatic transceivers. Each dual-polarization rotationally-insensitive monostatic transceiver is configured to simultaneously transmit and receive multiple polarizations, such as on the same wavelength and at the same time, on a non-interfering basis. Moreover, the performance of an optical link between transceivers can remain unaffected by rotational changes between the transceivers at either end of the optical link, which can be achieved passively (without feedback or optical control). Among other things, this is achieved using one or more techniques for using circularly polarized light. As a particular example, using directionally dependent polarization modification of the circularly polarized light can permit an optical signal propagating in one direction to undergo no polarization change while an optical signal propagating in the opposite direction is rotated by 90°.

Some embodiments of this disclosure provide dual-polarization transmit and receive capabilities in a monostatic transceiver. Various embodiments allow the same wavelength or different wavelengths to be used on any transmit or receiver channel without interference. Single-mode, multimode, or PM fiber may be used for outgoing optical signals. When PM fiber is not used, the transceiver may generate orthogonal transmit beams (also referred to as signals) that will not interfere. In some embodiments, a transceiver does not require complex dual cladding fiber and includes a passive rotationally-invariant transmit and receiver capability to simplify use across platforms. Moreover, some embodiments can maintain compatibility with intensity modulator or complex modulation formats. The transceivers can also maintain compatibility with multiple data rates on different channels if needed or desired or maintain compatibility with wavelength division multiplexing (WDM) for increasing data capacity. Some embodiments provide a transceiver that is compatible with an all-fiber-based etalon-enhanced receiver for modularity. Some embodiments enable separate tracking of multiple polarization channels when in the same field of view. According to some embodiments, position, acquisition, and tracking flexibility can be used depending on how a transceiver is configured. In addition, a monostatic transceiver may use directionally-dependent polarization modification to apply relative polarization rotation as a function of a direction of propagation of a light beam.

FIG. 1 illustrates an example free-space optical (FSO) system 100 according to this disclosure. As shown in FIG. 1, the system 100 includes two nodes 102 and 104 that communicate with one another optically. Each node 102 and 104 represents a ground-, air-, or space-based system that can transmit or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same structure to be used for both transmission and reception purposes. Similarly, while the optical transmitter 112 and the optical receiver 110 are shown here as separate components, they can be integrated into a single optical transceiver 120. This may allow, for instance, the same structure to be used for both transmission and reception purposes.

The optical transmitters, receivers, and transceivers described in this disclosure may find use in a large number of applications, such as communications, imaging, and remote sensing applications. For example, optical transmitters, receivers, or transceivers may be used in data centers or telecommunication systems to transport information rapidly between locations, including the transport of large amounts of information over very large distances. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing. In general, this disclosure is not limited to any particular application of the optical transmitters, receivers, and transceivers.

Although FIG. 1 illustrates one example of a free-space optical system 100, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

FIG. 2 illustrates an example monostatic optical transceiver 200 according to this disclosure. The optical transceiver 200 may, for example, represent or be used within the optical nodes 102 and 104 of the system 100 of FIG. 1. However, the optical transceiver 200 may be used in any other suitable device(s) and in any other suitable system(s).

As shown in FIG. 2, the monostatic optical transceiver 200 includes a collection telescope 202, a quarter waveplate 204, a polarization beam splitter (PBS) 206, and at least one directionally-dependent optical assembly (DDOA) 208a-208b. Each NROA 208a-208b includes a Faraday rotator 210 and a waveplate 212. Each DDOA 208a-208b represents a directionally-dependent polarization rotation optical assembly. The waveplate 212 can be a half waveplate or a quarter waveplate. In some embodiments, each DDOA 208a-208b includes a Faraday rotator 210 providing a polarization rotation of about 45° and a half waveplate 212 with its fast axis oriented at about 22.5° from the +x axis. However, other embodiments of the Faraday rotator 210 and the waveplate 212 may be used. For instance, various arrangements of Faraday rotators and waveplates are described in U.S. patent application Ser. No. 17/933,766 filed on Sep. 20, 2022 and entitled "SYSTEM AND METHOD FOR DIRECTIONALLY-DEPENDENT POLARIZATION MODIFICATION," which has been incorporated by reference above. In some embodiments, the monostatic optical transceiver 200 includes two or more channels and is configured to transmit and receive on each channel. Here, the monostatic optical transceiver 200 can employ two or more DDOA 208a-208b to provide directionally-dependent polarization modifications, such as to permit a beam propagating in one direction to undergo no substantial polarization change while a beam propagating in the opposite direction is rotated by about 90°.

In the optical transceiver 200, optical communication signals can be transmitted and received via respective light beams, which carry communication signals. Note that the terms "beams" and "signals" may be used interchangeably. In some cases, optical communication signals can be transmitted and received on at least two wavelengths or channels, where each channel includes transmit optical signals and receive optical signals. The collection telescope 202 is configured to receive and collimate incoming receive (Rx) beams 214 and diverge and direct outgoing transmit (Tx) beams 216. Each channel may include at least one transmit beam 216 and at least one receive beam 214.

The quarter waveplate 204 is configured, for each channel, to convert a polarization of light from a linear polarization to a circular/elliptical polarization and vice versa. For example, on a first channel (Ch1), the quarter waveplate 204 may be configured to (i) convert a transmit beam 218 having a P linear polarization (transmit PLP) into a transmit beam 216 having a right-hand circular (RHC) polarization and (ii) convert a receive beam 214 having a right-hand circular (RHC) polarization into a receive beam 220 having a P linear polarization (receive PLP). On a second channel (Ch2), the quarter waveplate 204 may be configured to (i) convert another transmit beam 218 having an S linear polarization (transmit SLP) into another transmit beam 216 having a left hand (LHC) polarization and (ii) convert another receive beam 214 having an LHC polarization into another receive beam 220 having an S linear polarization (receive SLP). The ability to transmit and receive optical beams having circular polarizations enables devices to communicate with one another irrespective of orientation. As a result, the quarter waveplate 204 enables two nodes (such as nodes 102 and 104 in FIG. 1) to communicate without having to be aligned with each other. In this example, the transmit beam 216 can include signals with P and S linear polarizations, and the receive beam 214 can include signals with P and S linear polarizations.

The PBS 206 is configured to combine and separate channels by combining and separating P and S components within optical beams. For example, in the outgoing direction, transmit beams are received from standard fiber terminals 232 and 234. The fiber terminals 232 and 234 are associated with different channels and can represent at least part of a fiber coupling that is configured to be coupled to at least one fiber optic cable. The PBS 206 can combine transmit beams 218a-218b having different P and S polarizations in different channels into the transmit beams 218. In the incoming direction, the PBS 206 can separate the receive beams 220 into receive beams 220a-220b having different P and S polarizations in the different channels. In this example, the transmit beam 218a and the receive beam 220a both have a P linear polarization, and the transmit beam 218b and the receive beam 220b both have an S linear polarization. As can be seen here, the PBS 206 is configured to separate the channels for the receive beams 220 and combine the channels for the transmit beams 218In this example, a mirror or other reflector 222 can be used to help direct signals to and from the PBS 206.

Each NROA 208a-208b can be configured to maintain or modify light according to a direction of propagation of the light through the NROA 208a-208b. In the example shown in FIG. 2, the NROA 208a receives the transmit beam 218a, and the NROA 208b receives the transmit beam 218b. In some cases, each NROA 208a-208b is configured to maintain an angular polarization of the associated transmit beam 218a-218b while modifying an angular polarization of an associated receive beam 220a-220b. For example, the transmit beams 218a-218b propagate through the respective NROAs 208a-208b in a first direction, while the receive beams 220a-220b propagate through the NROAs 208a-208b in a second direction opposite the first direction. In some cases, the transmit beams 218a-218b may pass through the NROAs 208a-208b with little or no polarization modifications, while the receive beams 220a-220b can have their polarizations rotated as they propagate through the NROAs 208a-208b. This results in the creation of receive beams 220a' and 220b'. Accordingly, each incoming beam can propagate along the receive direction and have its polarization rotated by about 90° or other angle compared to the associated outgoing beam (which may remain unchanged). Note, however, that this can be reversed so that the outgoing signals are rotated and the incoming signals are not. This approach supports the use of dual polarizations in the optical transceiver 200, which helps to provide rotational invariance between terminals with quarter waveplates. In some embodiments, the optical signals in the different channels of the optical transceiver 200 have different wavelengths.

In this example, a PBS 224 is configured to pass the transmit beam 218a and reflect the receive beam 220a', and a PBS 228 is configured to pass the receive beam 220b' and reflect the transmit beam 218b. Among other things, this directs the receive beams 220a'-220b' to standard fiber terminals 226 and 230. Note, however, that the passing and reflectings may be reversed here. The fiber terminals 226 and 230 are associated with different channels and can represent at least part of a fiber coupling that is configured to be coupled to at least one fiber optic cable.

Note that the depictions of the signals, polarizations, and fibers as shown in FIG. 2 are for illustration only, and the particulars of the separation and combining of signals can be changed without departing from the scope of this disclosure. Embodiments of the present disclosure provide a monostatic optical transceiver 200 that include at least one non-reciprocal optical assembly, namely one or more NROAs 208a-208b, which are used to provide directionally-dependent polarization modification that enable multiple beams to be used in the same transceiver aperture. In this example, the optical transceiver 200 is configured to communicate in free space using light having circular polarizations, which makes devices insensitive to relative orientation. The optical transceiver 200 here is designed so that counter-propagating beams of the same polarization can be separated on a non-interfering basis to provide the use of dual polarization.

In some embodiments, as described above, the NROAs 208a-208b can be configured to pass light in one direction substantially unmodified and to rotate the polarization of light passing in the opposite direction (such as by 90°). In some cases, this can be achieved using a Faraday rotator 210 that provides a polarization rotation of 45° and a half waveplate 212 with its fast axis oriented at 22.5° from the +x axis. In the first channel Ch1, transmit light (P polarized) is rotated 45° by the Faraday rotator 210 and then—45° by the half waveplate 212, leaving the outgoing polarization substantially unchanged. In the second channel Ch2, transmit light (S polarized) is rotated to 135° by the Faraday rotator 210, leaving an angle of 67.5° between the half waveplate's axis and the incident light. After passing through the half waveplate, the transmit light is rotated back, again leaving the outgoing polarization substantially unchanged. The outgoing beams are combined by the PBS 206, and the S and P polarizations are converted to circular polarizations after passing through the quarter waveplate 204. This enables dual-channel transmission.

For dual-channel rotationally-invariant reception, circularly-polarized light is captured by the collection telescope 202 and provided to the quarter waveplate 204, which can have its fast axis rotated by −45° (as viewed from the incoming light). The incoming light is converted to S and P polarized light, and these two orthogonal polarizations are separated by the PBS 206 into separate paths. In these paths, the S and P polarized receive beams overlap the S and P polarized transmit beams in space, but the transmit and receive beams travel in opposite directions in each path. In the NROA 208a, the P polarized receive beam is rotated to +135° by the half waveplate 212 and to the S polarization by the Faraday rotator 210. In the NROA 208b, the S polarized receive beam is rotated +45° by the half waveplate 212 and to the P polarization by the Faraday rotator 210. When propagating along the receive direction, both polarizations are rotated by 90° (while the transmit beams may be unchanged). This allows for dual polarization reception with rotational invariance. Note, however, that the positions of the Faraday rotator 210 and the waveplate 212 can be reversed.

Although FIG. 2 illustrate one example of a monostatic optical transceiver 200, various changes may be made to FIG. 2. For example, the monostatic optical transceiver 200 may include any suitable number of optical devices or different types of devices. As a more specific example, the particulars of the separation and combination of beams can be changed. Also, while the monostatic optical transceiver 200 shown in FIG. 2 is described as using half waveplates 212 in the NROAs 208a-208b, embodiments using quarter waveplates can be used. In addition, any other suitable components may be used with the monostatic optical transceiver 200 to support any other desired functions of the monostatic optical transceiver 200.

FIG. 3 illustrates an example method 300 for transmitting and receiving multiple non-interfering polarization signals according to this disclosure. For ease of explanation, the method 300 is described with respect to the monostatic optical transceiver 200 of FIG. 2. However, the method 300 could be used with any other suitable optical transceiver.

In step 302, transmit beams and receive beams are communicated via one or more waveguides, such as one or more standard fiber-optic cables. For example, two transmit beams can be received via fiber terminals 232 and 234 from one or more standard fiber-optic cables, and two receive beams can be provided via fiber couplings to one or more standard fiber-optic cables. Each of the transmits beams can be received with a respective polarity and on a respective channel, and each of the receive beams can be provided with a respective polarity on a respective channel. As a particular example, a first transmit beam with a P polarization may be received on a first channel, a second transmit beam with an S polarization may be received on a second channel, a first receive beam with an S polarization may be provided on the first channel, and a second receive beam with a P polarization may be provided on the second channel.

In step 304, the transmit and receive beams for each channel are isolated. For example, the transmit and receive beams for the first channel may be separated by the PBS 224, and the transmit and receive beams for the second channel may be separated by the PBS 228. Each PBS 224 and 228 can separate light based on the polarizations in the light. In step 306, the transmit and receive beams are propagated through non-reciprocating optical assemblies, such as NROAs 208a-208b. For example, in the first channel, the first transmit beam and the first receive beam can propagate through a first NROA 208a. In the second channel, the second transmit beam and the second receive beam can propagate through a second NROA 308b. In some cases, each NROA 208a-208b may be configured to pass light (such as the transmit beams) propagating in one direction substantially unmodified while rotating the polarization of light (such as the receive beams) propagating in the opposite direction.

In step 308, the transmit beams from the channels are combined, and the receive beams are separated into the channels. For example, the transmit beams from the channels may be combined by allowing the transmit beam from the first channel to propagate through the PBS 206 while reflecting the transmit beam from the second channel by the PBS 206. The PBS 206 can also split incoming light into the receive beams in the channels based on the polarizations in the incoming light.

In step 310, the transmit and receive beams propagate through a quarter waveplate. The quarter waveplate 204 converts the transmit beams from linear polarizations to circular/elliptical polarizations, and the quarter waveplate 204 converts the receive beams from circular/elliptical polarizations to linear polarizations. In step 312, the beams are used for communication or other purposes.

Although FIG. 3 illustrates one example of a method 300 for transmitting and receiving multiple non-interfering polarization signals, various changes may be made to FIG. 3. For example, while shown as a series of steps, various steps in FIG. 3 could overlap, occur in parallel, occur in a different order, or occur multiple times.

It may be advantageous to set forth definitions of certain words and phrases used throughout this patent document.

The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   first and second polarization beamsplitters each configured to separate optical signals having different polarizations, wherein the optical signals having the different polarizations comprise incoming optical signals that pass through an aperture and outgoing optical signals that pass through the aperture;
   first and second directionally-dependent polarization rotation optical assemblies each configured to maintain a polarization of one of the optical signals and to rotate a polarization of another of the optical signals; and
   a third polarization beamsplitter configured to (i) combine the outgoing optical signals to produce transmit optical signals and (ii) separate receive optical signals to produce the incoming optical signals.

2. The apparatus of claim 1, wherein the first directionally-dependent polarization rotation optical assembly comprises:
   a Faraday rotator and a waveplate optically positioned between the first polarization beamsplitter and the third polarization beamsplitter, the Faraday rotator and the waveplate collectively configured to provide a relative polarization change between (i) light propagating in a first direction through the Faraday rotator and the waveplate and (ii) light propagating in a second direction opposite the first direction through the Faraday rotator and the waveplate.

3. The apparatus of claim 1, wherein the third polarization beamsplitter is configured to:
   combine a first outgoing optical signal of the outgoing optical signals from a first channel with a second outgoing optical signal of the outgoing optical signals from a second channel; and
   provide a first incoming optical signal of the incoming optical signals for the first channel and a second incoming optical signal of the incoming optical signals for the second channel.

4. The apparatus of claim 3, wherein:
   the first directionally-dependent polarization rotation optical assembly is configured to rotate a polarization of the first incoming optical signal from a P polarization to an S polarization while maintaining a P polarization of the first outgoing optical signal; and
   the second directionally-dependent polarization rotation optical assembly is configured to rotate a polarization of the second incoming optical signal from an S polarization to a P polarization while maintaining an S polarization of the second outgoing optical signal.

5. The apparatus of claim 1, further comprising:
   a fiber coupling configured to couple to a fiber optic cable, the fiber coupling comprising first fiber terminals for a first channel and second fiber terminals for a second channel.

6. The apparatus of claim 5, wherein:
   the first channel is associated with a first outgoing optical signal of the outgoing optical signals and a first incoming optical signal of the incoming optical signals, the first outgoing optical signal and the first incoming optical signal associated with a first wavelength; and
   the second channel is associated with a second outgoing optical signal of the outgoing optical signals and a second incoming optical signal of the incoming optical signals, the second outgoing optical signal and the second incoming optical signal associated with a second wavelength.

7. The apparatus of claim 1, further comprising:
   a waveplate configured to (i) convert the transmit optical signals into first free-space optical signals having a right-hand circular polarization to be transmitted on a first wavelength and a left-hand circular polarization to be transmitted on a second wavelength and (ii) convert second free-space optical signals having a left-hand circular polarization received on the first wavelength and a right-hand circular polarization received on the second wavelength into the receive optical signals having a linear polarization.

8. The apparatus of claim 7, further comprising a transceiver;
   wherein the transceiver comprises the polarization beamsplitters, the directionally-dependent polarization rotation optical assemblies, and the waveplate.

9. A system comprising:
   a fiber coupling configured to couple to a fiber optic waveguide, the fiber coupling comprising first fiber terminals for a first channel and second fiber terminals for a second channel;
   at least one first polarization beamsplitter configured to separate optical signals having different polarizations, wherein the optical signals having the different polarizations comprise incoming optical signals that pass through the fiber optic waveguide and outgoing optical signals that pass through the fiber optic waveguide;
   at least one directionally-dependent polarization rotation optical assembly configured to maintain a polarization of one of the optical signals and to rotate a polarization of another of the optical signals; and a second polarization beamsplitter configured to (i) combine the outgoing optical signals to produce transmit optical signals and (ii) separate receive optical signals to produce the incoming optical signals.

10. The system of claim 9, wherein the at least one directionally-dependent polarization rotation optical assembly comprises:

a Faraday rotator and a waveplate collectively configured to provide a relative polarization change between (i) light propagating in a first direction through the Faraday rotator and the waveplate and (ii) light propagating in a second direction opposite the first direction through the Faraday rotator and the waveplate.

11. The system of claim 10, wherein the Faraday rotator and the waveplate are collectively configured to apply a 90° polarization rotation to the light propagating in one of the first and second directions.

12. The system of claim 9, wherein the second polarization beamsplitter is configured to:

combine a first outgoing optical signal of the outgoing optical signals from the first channel with a second outgoing optical signal of the outgoing optical signals from the second channel; and provide a first incoming optical signal of the incoming optical signals for the first channel and a second incoming optical signal of the incoming optical signals for the second channel.

13. The system of claim 9, further comprising:

a waveplate configured to (i) convert one or more linear polarizations of the transmit optical signals into one or more circular/elliptical polarizations and (ii) convert one or more circular/elliptical polarizations of the receive optical signals into one or more linear polarizations.

14. The system of claim 9, further comprising:

a telescope configured to emit the transmit optical signals and receive the receive optical signals.

15. A method comprising:

separating optical signals having different polarizations using first and second polarization beamsplitters, wherein the optical signals having the different polarizations comprise incoming optical signals that pass through an aperture and outgoing optical signals that pass through the aperture;

passing the optical signals through first and second directionally-dependent polarization rotation optical assemblies, each of the directionally-dependent polarization rotation optical assemblies maintaining a polarization of one of the optical signals and rotating a polarization of another of the optical signals;

combining the outgoing optical signals to produce transmit optical signals; and separating receive optical signals to produce the incoming optical signals.

16. The method of claim 15, wherein the first directionally-dependent polarization rotation optical assemblies comprises:

a Faraday rotator and a waveplate collectively providing a relative polarization change between (i) light propagating in a first direction through the Faraday rotator and the waveplate and (ii) light propagating in a second direction opposite the first direction through the Faraday rotator and the waveplate.

17. The method of claim 16, wherein a third polarization beamsplitter combines the outgoing optical signals to produce the transmit optical signals and separates the receive optical signals to produce the incoming optical signals.

18. The method of claim 15, wherein:

a first channel is associated with a first outgoing optical signal of the outgoing optical signals and a first incoming optical signal of the incoming optical signals, the first outgoing optical signal and the first incoming optical signal associated with a first wavelength; and a second channel is associated with a second outgoing optical signal of the outgoing optical signals and a second incoming optical signal of the incoming optical signals, the second outgoing optical signal and the second incoming optical signal associated with a second wavelength.

19. The method of claim 18, wherein:

the first directionally-dependent polarization rotation optical assembly rotates a polarization of the first incoming optical signal from a P polarization to an S polarization while maintaining a P polarization of the first outgoing optical signal; and the second directionally-dependent polarization rotation optical assembly rotates a polarization of the second incoming optical signal from an S polarization to a P polarization while maintaining an S polarization of the second outgoing optical signal.

20. The method of claim 15, further comprising:

using a waveplate to:

convert the transmit optical signals into first free-space optical signals having a right-hand circular polarization to be transmitted on a first wavelength and a left-hand circular polarization to be transmitted on a second wavelength; and convert second free-space optical signals having a left-hand circular polarization received on the first wavelength and a right-hand circular polarization received on the second wavelength into the receive optical signals having a linear polarization.

* * * * *